United States Patent
Tsukamoto et al.

(10) Patent No.: US 10,061,095 B2
(45) Date of Patent: Aug. 28, 2018

(54) INDOOR CABLE USED AS OPTICAL FIBER CABLE

(71) Applicant: FURUKAWA ELECTRIC CO., LTD., Tokyo (JP)

(72) Inventors: Masayoshi Tsukamoto, Tokyo (JP); Yutaka Hoshino, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/515,781

(22) PCT Filed: Mar. 16, 2015

(86) PCT No.: PCT/JP2015/057729
§ 371 (c)(1),
(2) Date: Mar. 30, 2017

(87) PCT Pub. No.: WO2016/056265
PCT Pub. Date: Apr. 14, 2016

(65) Prior Publication Data
US 2017/0299833 A1    Oct. 19, 2017

(30) Foreign Application Priority Data
Oct. 6, 2014 (JP) ................................. 2014-205816

(51) Int. Cl.
*G02B 6/44* (2006.01)

(52) U.S. Cl.
CPC ......... *G02B 6/4432* (2013.01); *G02B 6/4415* (2013.01); *G02B 6/4436* (2013.01)

(58) Field of Classification Search
CPC .... G02B 6/443; G02B 6/4401; G02B 6/4403; G02B 1/04; G02B 1/14; C08F 220/14; C08J 5/18
See application file for complete search history.

(56) References Cited

U.S. PATENT DOCUMENTS 4,422,716 A * 12/1983 Morimoto ............ G02B 6/3821
385/78
4,787,705 A * 11/1988 Shinmoto ............ G02B 6/4416
385/101

(Continued)

FOREIGN PATENT DOCUMENTS

JP   H10-010379 A   1/1998
JP   200865038 A    3/2008

(Continued)

OTHER PUBLICATIONS

International Search Report issued in PCT/JP2015/057729 dated Jun. 2, 2015.

(Continued)

*Primary Examiner* — Akm Enayet Ullah
(74) *Attorney, Agent, or Firm* — Marshall, Gerstein & Borun LLP

(57) ABSTRACT

An indoor cable is composed of an optical fiber core, tension members, an outer sheath, and so forth. The optical fiber core and the tension members are integrated by the outer sheath. The outer sheath is composed of a transparent material. The optical fiber core includes a glass wire and a resin coating (a primary resin layer and a secondary resin layer). The optical fiber core does not have a colored layer that is conventionally formed on the outer periphery of the resin coating layer. That is, the optical fiber core is composed entirely of transparent materials. On both sides of the optical fiber core, separate from the optical fiber core, is arranged a pair of tension members. The tension members are composed of transparent materials.

5 Claims, 1 Drawing Sheet

(56) References Cited

U.S. PATENT DOCUMENTS

| | | | | |
|---|---|---|---|---|
| 4,974,926 A * | 12/1990 | Blee | ............... | G02B 6/4427 385/107 |
| 5,087,110 A * | 2/1992 | Inagaki | ............... | G02B 6/4407 385/110 |
| 6,411,761 B1 * | 6/2002 | Yokokawa | ............... | G02B 6/4433 385/102 |
| 8,162,546 B1 | 4/2012 | Mumm et al. | | |
| 8,189,974 B2 * | 5/2012 | Hashimoto | ............... | G02B 6/443 385/109 |
| 8,596,018 B2 * | 12/2013 | Dagher | ............... | F41H 5/013 52/222 |
| 8,842,955 B2 * | 9/2014 | Tsukamoto | ............... | G02B 6/4402 385/102 |
| 9,390,842 B2 * | 7/2016 | Hayashishita | ............... | H01B 13/34 |
| 2009/0034922 A1 * | 2/2009 | Yasutomi | ............... | G02B 6/443 385/113 |
| 2010/0033652 A1 * | 2/2010 | Yamashita | ............... | G02B 1/111 349/64 |
| 2011/0014452 A1 * | 1/2011 | Uto | ............... | G02B 6/1221 428/220 |
| 2011/0150402 A1 * | 6/2011 | Hoshino | ............... | G02B 6/443 385/102 |
| 2011/0311191 A1 * | 12/2011 | Hayashishita | ............... | G02B 6/4416 385/101 |
| 2014/0119698 A1 | 5/2014 | Sakabe et al. | | |
| 2015/0150402 A1 * | 6/2015 | Paauw | ............... | A47J 27/04 99/410 |

FOREIGN PATENT DOCUMENTS

| | | |
|---|---|---|
| JP | 2008-309894 A | 12/2008 |
| JP | 2009-128495 A | 6/2009 |
| JP | 2014-058649 A | 4/2014 |
| JP | 2014085554 A | 5/2014 |
| JP | 2014-109751 A | 6/2014 |
| KR | 20040042366 A | 5/2004 |
| WO | WO-2014/006996 A1 | 1/2014 |

OTHER PUBLICATIONS

Extended European Search Report issued in European Patent Application No. 15848638 dated Apr. 26, 2018.

* cited by examiner

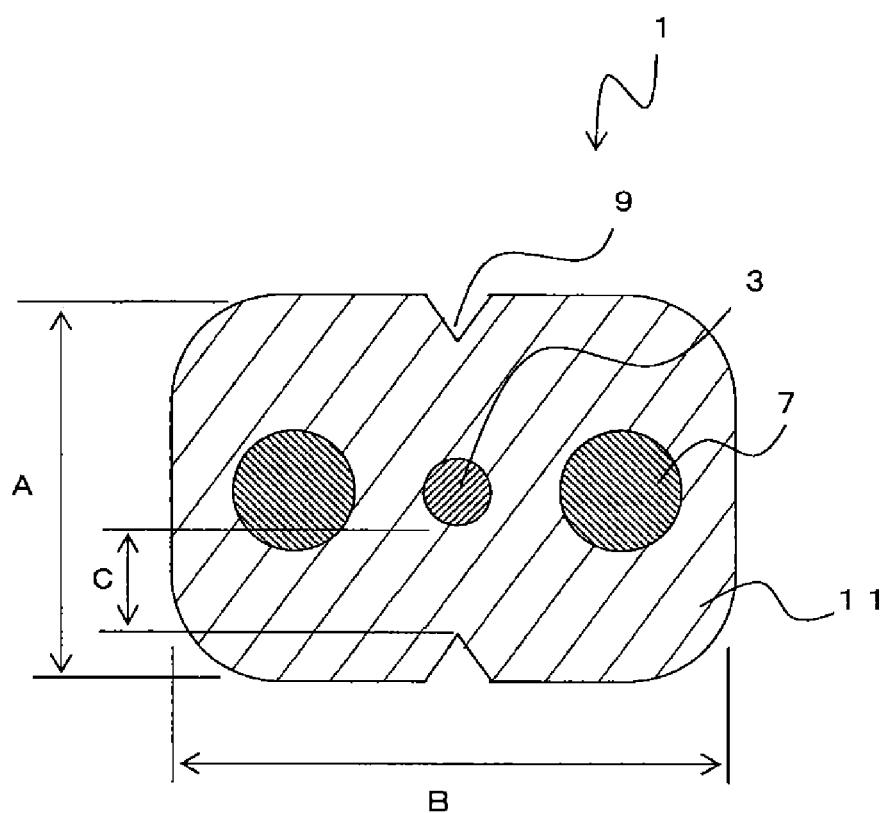

INDOOR CABLE USED AS OPTICAL FIBER CABLE

TECHNICAL FIELD

The present disclosure relates to an optical fiber cable and so forth that is inconspicuous when installed indoors.

BACKGROUND

Usually, when an optical fiber cable is drawn indoors, an indoor cable is used. The indoor cable is connected to an optical line termination device, which is then connected to various fiber-optic-utilizing equipment by LAN cables and so forth.

As such optical fiber cables, for example, an optical fiber cable comprising tension members, an optical fiber core arranged between the tension members, and an outer sheath that wraps these together, which further comprises one or more cable sheath notch arranged along the periphery of the outer sheath in the longitudinal direction, is known (e.g., JP2008-A-65038).

However, when the indoor cable is installed indoors, the indoor cable tends to stand out, thereby spoiling the overall appearance of the interior.

SUMMARY

The presently disclosed embodiments were made in view of such problems, and their object is to provide an indoor cable and so forth that can be installed without spoiling the appearance of the interior, which is also excellent in installation workability.

In order to achieve the above-described object, an indoor cable is disclosed, which comprises an optical fiber core, tension members arranged on both sides of the optical fiber core in a cross section vertical to the longitudinal direction, and an outer sheath that is arranged in such a way so as to cover the tension members and the optical fiber core, wherein the optical fiber core, the tension members, and the outer sheath are all composed of transparent materials.

It is preferable that the transparent materials that compose the optical fiber core, the tension members, and the outer sheath all have total light transmittances, defined by JIS K7361-1, of 60% or higher, and a haze value, defined by JIS K7136, of 15% or lower.

It is preferable that the transparent material of the outer sheath is a material comprising urethane resin, flexible acrylic resin, PVC, polypropylene, low-density polyethylene, or nylon as its base material.

It is preferable that the transparent material of the tension members is a fiber-reinforced plastic with polyethylene naphthalate, polyethylene terephthalate, or polycarbonate monofilaments, glass fibers, high-strength polypropylene fibers, or ultra-high molecular weight polyethylene fibers, or a transparent resin reinforced by glass fillers.

The cross-sectional shape of the indoor cable may be substantially rectangular, and the width of the longer sides may be 1.7 mm to 3.1 mm.

According to the present embodiments, since the optical fiber core, tension members, and the outer sheath are all composed of transparent materials, it is less likely to spoil the appearance when installed indoors. For example, although colored optical fiber cores are normally used as the optical fiber core in order to differentiate optical fiber cores or to enhance visibility, the colored layer is deliberately removed.

Further, although tension members have normally been composed of non-transparent materials such as steel wire and aramid fiber-reinforced plastics, the tension members are deliberately composed of transparent materials. Thus, the tension members do not stand out.

Furthermore, although the outer sheath has normally been colored in light colors such as white, so as not to stand out against light-colored wallpapers and so forth, the outer sheath is deliberately composed of transparent members. By composing all components with transparent materials, the indoor cable does not stand out when installed indoors.

In particular, when the transparent members that compose the indoor cable have total light transmittances, defined by JIS K7361-1, of 60% or higher, and haze values, defined by JIS K7136, of 15% or lower, such effect is enhanced.

Further, as the material for the transparent tension members, by applying a fiber-reinforced plastic with polyethylene naphthalate, polyethylene terephthalate, or polycarbonate monofilaments, glass fibers, high-strength polypropylene fibers, or ultra-high molecular weight polyethylene fibers, or a transparent resin reinforced by glass fillers, strength and transparency can both coexist.

Further, as the material for the transparent outer sheath, by applying a material comprising urethane resin, flexible acrylic resin, PVC, polypropylene, low-density polyethylene, or nylon as its base material, with its tensile strength, breaking extension, rigidity and so forth adjusted, properties required by a cable outer sheath and sufficient transparency can both be secured.

Furthermore, when the cross-sectional shape of the indoor cable is substantially rectangular and the width of the longer sides of the indoor cable is 3.1 mm or smaller, the indoor cable becomes inconspicuous, since its size is not too large. Further, when the width of the longer sides of the indoor cable is 1.7 mm or larger, its handling property also becomes excellent.

According to the disclosed embodiments, an indoor cable that does not spoil the appearance of the interior, which is also excellent in installation workability, can be provided.

BRIEF DESCRIPTION OF DRAWINGS

FIG. 1 is a sectional scheme of the indoor cable 1.

DETAILED DESCRIPTION

Hereinafter, embodiments will be described with reference to the FIGURES. FIG. 1 is a sectional scheme of the indoor cable 1. The indoor cable 1 is composed of an optical fiber core 3, tension members 7, and a first outer sheath 11 and so forth.

The optical fiber core 3 and tension members 7 are integrated by the first outer sheath 11. The outer sheath 11 is composed of transparent materials. As the material for the transparent outer sheath, a material comprising urethane resin, flexible acrylic resin, PVC, low-density polyethylene or nylon as its base material, with its tensile strength, breaking extension, rigidity and so forth adjusted, can be applied.

Note that the addition of conventionally-used magnesium hydroxide and aluminum hydroxide in order to impart fire-resistance to the outer sheath 11 causes the outer sheath 11 to turn whitish and its transparency deteriorates. For this reason, to impart fire-resistance to the outer sheath 11, the addition of flame retardants such as bromine flame retardants and chlorine flame retardants, antimony trioxide with its particle size adjusted, phosphorous flame retardant promoters such as phosphates is preferable.

Here, as shown in FIG. 1, the indoor cable 1 preferably has a substantially rectangular cross-sectional shape, as in generally-used indoor cables. In such case, it is preferable that the width of the longer side of the indoor cable 1 (B in the FIGURE) is 1.7 mm to 3.1 mm. When the width of the indoor cable 1 is too large, the indoor cable 1 tends to stand out more. Further, when the width of the indoor cable 1 is too small, its handleability (in installation process and branching process) worsens.

On the top and bottom surfaces of the outer sheath 11 of the optical fiber core 3 (the outer peripheral surface that is vertical to the installation direction of the tension member 7), notches 9 are formed on positions facing each other. By rupturing the outer sheath 11 from the top and bottom notches 9 using a cable splitter or a nipper, the optical fiber core 3 can be separated from the tension members 7 and the outer sheath 11 and extracted.

The optical fiber core 3 is composed of a glass wire and a resin coating (primary resin layer and secondary resin layer). The optical fiber core 3 does not have a colored layer, which has been conventionally formed on the outer periphery of the resin coating layer. That is, the optical fiber core 3 is composed entirely of transparent materials.

As the optical fiber core 3, for example, conventional optical fiber cores of 0.20 mm diameter and 0.25 mm diameter can be applied. Further, they can be made into 0.5 mm diameter and 0.9 mm diameter by forming an overcoat layer on the outer-most layer.

In this case, it is preferable that the overcoat layer is also composed of a transparent material. As the overcoat layer, for example, PVC, styrene elastomers, fluorocarbon rubbers, silicone rubbers, polycarbonates, nylon, urethane, polyester elastomers, thermoplastic resins such as low molecular weight polyethylene, and ultraviolet curing resins such as urethane acrylate, may be applied. Note that as the outer diameter of the optical fiber core 3 becomes larger, the size of the outer sheath 11 that covers it becomes larger. Thus, as the optical fiber core 3, for example, those of 0.20 mm diameter and 0.25 mm diameter are preferable.

On both sides of the optical fiber core 3, separate from the optical fiber core 3, a pair of tension members 7 are arranged. The tension members 7 are composed of transparent materials. As the transparent material that compose the tension members 7, any one of fiber-reinforced plastic with polyethylene naphthalate, polyethylene terephthalate, or polycarbonate monofilaments, glass fibers, high-strength polypropylene fibers, or ultra-high molecular weight polyethylene fibers, or a transparent resin reinforced by glass fillers may be applied. Note that the matrix resin for the fiber-reinforced plastic is preferably one that is highly transparent such as acrylic resins such as PMA, polycarbonates, and polystyrene, rather than one with a high ratio of diffusive light such as unsaturated polyester. In this way, the transparency of the tension members 7 can be enhanced. Further, for example, when using glass fiber, by using glass fibers of high transparency obtained by treating at high temperature to remove impurities, highly transparent glass fiber-reinforced FRP can be obtained.

It is preferable that the transparent materials that compose the indoor cable 1 all have total light transmittances, defined by JIS K7361-1, of 60% or higher. When the total light transmittance is below 60%, the shade of the indoor cable 1 becomes stronger and therefore more prominent. Note that it is further preferable that the total light transmittance of the indoor cable 1 is 80% or more.

Further, it is preferable that the transparent materials that compose the indoor cable 1 all have haze values, defined by JIS K7136, of 15% or lower. The haze value is represented by the diffuse transmission factor/total light transmittance× 100%. When the haze value exceeds 15%, the haze becomes higher and therefore the transparent material tends to stand out more. Further, as the material that compose the tension members 7 and the outer sheath 11, it is preferable to select one with a refractive index close to about 1.46 (for example, 1.46±0.2), which is the refractive index of the optical fiber core 3.

Note that since the adhesive agent that is applied on the outer periphery of the tension members 7 is thin, conventional adhesive agents can be used as they are.

As described above, due to the conventionally unknown idea of making the optical fiber core 3, tension members 7 and outer sheath 11, which compose the indoor cable 1, completely transparent, an indoor cable that is inconspicuous when installed indoors can be obtained. That is, even if the optical fiber core or cable is installed on its own, since all components are transparent, by using these in combination, a new effect, which is that the appearance of the interior is not ruined, can be obtained.

EXAMPLES

Multiple trial pieces of indoor cables with different sizes were prepared, wired on an interior wall and a corner of the wall and the floor, after which they were evaluated for their prominence. The degree of prominence was determined by looking at the installed indoor cable from a point 1 m away. The size and evaluation results for the indoor cables are shown in Table 1.

TABLE 1

| | Short Side × Long Side of Cable (mm) | Appearance |
|---|---|---|
| Sample 1 | 2.8 × 3.7 | Δ |
| Sample 2 | 2.0 × 3.7 | Δ |
| Sample 3 | 2.0 × 3.1 | ○ |
| Sample 4 | 1.6 × 2.0 | ◎ |
| Sample 5 | 1.1 × 1.7 | ◎ |

The shorter side of the cable is length A in FIG. 1 and the longer side of the cable is length B in FIG. 1. For Samples 1 to 5, optical fiber cores (0.25 mm diameter) without colored layers were used, and as the tension members, glass fiber FRP of 0.45 mm diameter were used. The distance between the tip of the notch and the fiber (length C in FIG. 1) was set as 0.3 mm. For the outer sheath, highly-transparent flexible acrylic resin was used.

In terms of the appearance, the indoor cable was visually observed, and those that were completely inconspicuous were marked with a ○, those that could barely be visualized but were almost inconspicuous were marked with a Δ, and those that could slightly be visualized were marked with a x.

According to Table 1, when the length of the longer side exceeds 3.1 mm, the transparency deteriorated because its size became large and thick, making the indoor cable more visible. On the other hand, when the length of the longer side was 3.1 mm or smaller, the indoor cable became almost inconspicuous. In particular, when the length of the longer side was 2.0 mm or smaller, the indoor cable became completely inconspicuous.

Note that when the length of the longer side becomes smaller than 1.7 mm, the branching process becomes difficult, and is thus not preferred.

Although embodiments have been described in detail above with reference to the accompanying FIGURES, the claims are not intended to be limited to such embodiments. It should be obvious to those in the field that examples of various changes and modifications are included within the realm of the technical idea of the disclosed embodiments, and it should be understood that such examples are included in the contemplated technical scope.

For example, the indoor cable 1 may be integrated with a supporting wire by another outer sheath to compose a drop cable. In such a case, the other outer sheath does not necessarily have to be transparent, and may be of conventional resins, taking in consideration weather resistance and so forth. By doing so, joints between the drop cable and the indoor cable become unnecessary, because the indoor cable can be extracted from the drop cable and installed indoors.

The invention claimed is:

1. An indoor cable comprising:
   an optical fiber core,
   tension members arranged on both sides of the optical fiber core in a cross section vertical to the longitudinal direction, and
   an outer sheath that is arranged in such a way so as to cover the tension member and the optical fiber core, wherein
   the optical fiber core, the tension members, and the outer sheath are all composed of transparent materials, and
   the transparent materials that compose the optical fiber core, the tension members, and the outer sheath all have total light transmittances of 60% or higher, and a haze value of 15% or lower.

2. The indoor cable according to claim 1, wherein materials composing the tension members and the outer sheath have refractive indexes close to a refractive index of the optical fiber core.

3. The indoor cable according to claim 1, wherein the transparent material of the tension members is a fiber-reinforced plastic with polyethylene naphthalate, polyethylene terephthalate, or polycarbonate monofilaments, glass fibers, high-strength polypropylene fibers, or ultra-high molecular weight polyethylene fibers, or a transparent resin reinforced by glass fillers.

4. The indoor cable according to claim 1, wherein the transparent material of the outer sheath is a material comprising urethane resin, flexible acrylic resin, PVC, polypropylene, low-density polyethylene, polyethylene terephthalate, or nylon as its base material.

5. The indoor cable according to claim 1, wherein the cross-sectional shape of the indoor cable is substantially rectangular and the width of the longer sides is 1.7 mm to 2.0 mm and the width of the shorter sides is 1.1 mm to 1.6 mm.

* * * * *